United States Patent
Kim et al.

(10) Patent No.: US 7,120,109 B1
(45) Date of Patent: Oct. 10, 2006

(54) OPTICAL PICKUP WITH IMPROVED COLLIMATING LENS FOR USE WITH LONG AND SHORT WAVELENGTH LASER BEAMS

(75) Inventors: Tae-kyung Kim, Suwon (KR); Chong-sam Chung, Seongnam (KR); Young-man Ahn, Suwon (KR); Hea-jung Suh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 09/698,201

(22) Filed: Oct. 30, 2000

(30) Foreign Application Priority Data

Oct. 30, 1999 (KR) .............................. 1999-47749
Oct. 30, 1999 (KR) .............................. 1999-47751

(51) Int. Cl.
*G11B 7/00* (2006.01)
(52) U.S. Cl. ................................ 369/112.24; 369/44.23
(58) Field of Classification Search ........... 369/112.23, 369/53.23, 112.01, 112.26, 44.12, 44.37, 369/44.24, 112.28, 275.1, 112.08, 64.23, 369/58, 112.1, 112.13, 53.2, 112.04, 44.23, 369/112.24; 359/649, 641, 719, 19, 753, 359/708, 717
See application file for complete search history.

(56) References Cited

U.S. PATENT DOCUMENTS

| | | | | |
|---|---|---|---|---|
| 4,909,616 A | | 3/1990 | Arai ............................ | 359/708 |
| 5,596,452 A | | 1/1997 | Yamakawa ................... | 359/691 |
| 5,636,029 A | * | 6/1997 | Zimmerman et al. ........ | 356/626 |
| 5,708,643 A | * | 1/1998 | Choi et al. ............. | 369/112.26 |
| 5,724,335 A | * | 3/1998 | Kobayashi ............. | 369/112.08 |
| 5,774,279 A | | 6/1998 | Kiriki et al. ................. | 359/753 |
| 5,808,999 A | * | 9/1998 | Yagi ....................... | 369/112.26 |
| 6,043,912 A | | 3/2000 | Yoo et al. ....................... | 359/19 |
| 6,069,868 A | * | 5/2000 | Kashiwagi ............... | 369/275.1 |
| 6,097,691 A | * | 8/2000 | Shimozono ............ | 369/112.24 |
| 6,175,548 B1 | * | 1/2001 | Kashiwagi ............... | 369/275.1 |
| 6,301,216 B1 | | 10/2001 | Takahashi ............. | 369/112.88 |
| 6,411,442 B1 | * | 6/2002 | Ota et al. ................... | 359/642 |
| 6,411,587 B1 | * | 6/2002 | Arai et al. ............. | 369/112.01 |
| 6,418,108 B1 | * | 7/2002 | Ueda et al. ............ | 369/112.23 |

(Continued)

FOREIGN PATENT DOCUMENTS

EP    0844605    5/1996

(Continued)

OTHER PUBLICATIONS

Tatsuy Narahara, et al.; "Optical Disc System for Digital Video Recording", Japanese Journal of Applied Phsycis, 2000, pp. 912-919.

(Continued)

*Primary Examiner*—Thang V. Tran
*Assistant Examiner*—Kim-Kwok Chu
(74) *Attorney, Agent, or Firm*—Stein, McEwen & Bui, LLP

(57) ABSTRACT

An optical pickup capable of effectively reducing chromatic aberration that includes a collimating lens, which includes a diverging lens with diverging power and a focusing lens with focusing power, arranged on the optical path between a light source and an objective lens, wherein assuming that the total focal length of the collimating lens is f and the focal length of the diverging lens is fn, the collimating lens satisfies the relationship $-1.5 > f/fn$. The optical pickup is compatible with both existing digital versatile disks (DVDs), and high-definition (HD)-DVDs, which will not yet standardized, need a blue light source near 405 nm and an objective lens having an numerical aperture of 0.6 or more.

82 Claims, 15 Drawing Sheets

U.S. PATENT DOCUMENTS 6,570,827 B1    5/2003   Yamamoto et al. ...... 369/44.14

FOREIGN PATENT DOCUMENTS

| | | |
|---|---|---|
| EP | 0831466 | 3/1998 |
| GB | 2382776 | 5/1998 |
| JP | 10-123410 | 5/1998 |
| JP | 2000-019388 | 1/2000 |

OTHER PUBLICATIONS

Patent Abstract of Japan for Japanese Publication No. 11296893, published Oct. 29, 1999.

Patent Abstract of Japan for Japanese Publication No. 10283668, published Oct. 23, 1998.

* cited by examiner

OPTICAL PICKUP WITH IMPROVED COLLIMATING LENS FOR USE WITH LONG AND SHORT WAVELENGTH LASER BEAMS

CROSS-REFERENCE TO RELATED APPLICATIONS

This application claims the benefit of Korean Application Nos. 99-47749 and 99-47751 and, both filed Oct. 30, 1999 in the Korean Industrial Property Office, the disclosures of which are incorporated herein by reference.

BACKGROUND OF THE INVENTION

1. Field of the Invention

The present invention relates to an optical pickup for high-density information writing and reading systems, and more particularly, to an optical pickup capable of reducing chromatic aberration that occurs when a blue light source is employed.

2. Description of the Related Art

In optical writing and reading systems, the recording density is determined by the size of a focused spot. In general, the size of the focused spot (S) is proportional to a wavelength ($\lambda$), and inversely proportional to a numerical aperture (NA) as expressed by the formula (1):

$$S \propto \lambda/NA \quad (1)$$

For a higher recording density than is achieved with compact disks (CDs) or digital versatile disks (DVDs), the size of the spot being focused on an optical disk must be further reduced. To reduce the spot size, as can be inferred from the formula (1), the wavelength ($\lambda$) of the laser beam must be reduced, and the NA of the objective lens must be increased. Thus, for such high density information recording, a laser beam having a short wavelength such as a blue laser, must be employed as a light source, and the NA of the objective lens must be maintained to be 0.6 or more.

FIG. 1 is a graph showing the variation of emission wavelength of a laser diode with respect to output power at various temperatures of the laser diode case. FIG. 2 is a graph showing the variation of the index of refraction with respect to the wavelength for various optical materials. Referring to FIG. 1, as the output power increases at a particular case temperature, the wavelength of emission increases proportionally, which is a feature of laser diodes. As shown in FIG. 2, the index of refraction of various optical materials sharply varies in a short wavelength region, for example, near 400 nm, compared to at 780 nm for compact disks (CDs) and at 650 nm for digital versatile disks (DVDs).

When writing information to an optical disk, a desired position on the optical disk is located using reading power, and then a recording mark is made at the desired position by increasing the output to writing power. However, such a sudden variation in output power causes a chromatic aberration in the optical system, thereby defocusing the optical spot on the optical disk. In addition, it takes considerable time to correct the defocusing by the control of a servo circuit.

Further, when a high frequency (HF) module is used to reduce noise caused by light reflected from an optical disk toward a light source, the wavelength of light emitted from the light source increases, thereby increasing the chromatic aberration in the optical system and, in particular, in the objective lens. This causes a deterioration in the quality of a reproduction signal. Lastly, it should be further considered that, as can be seen from FIG. 1, the wavelength of emission increases with temperature inside of the optical pickup, and the wavelength variation from using different light sources changes the chromatic aberration.

Various optical pickups, which have a light source having a wavelength of 650 nm and an objective lens, have been suggested so as to be compatible with 0.6 mm-thick DVDs and 1.2 mm-thick CDs. Among the techniques used in the suggested optical pickups are an annular shielding technique for blocking light passing through an intermediate area between far axis and near axis areas, a method for controlling the NA of an objective lens by using liquid crystal (LC) shutters, and a hologram optical element (HOE) technique for splitting light using a HOE to form individual focuses onto two disks having different thicknesses. However, for a compact disk recordable (CD-R), the reflectivity with respect to the red light source sharply drops, and thus a light source having a wavelength of 780 nm is necessary. For this reason, the use of a DVD indefinite/CD definite optical system that is compatible with light beams of both 780 nm and 650 nm, or the use of an objective lens having an annular focus region between far axis and near axis regions has been suggested. In particular, for a CD definite optical system, the NA of the objective lens is reduced and the divergent light is incident on the objective lens, thereby correcting the aberration caused by the difference in the thickness of disks and the objective lens.

An optical pickup using a short wavelength light source is required for higher density information writing and reading than DVD systems are capable of. As an example, for an optical pickup for HD-DVDs, laser light having a wavelength shorter than 650 nm used for DVDs, is required as a light source. However, as previously explained with reference to FIG. 2, since the index of refraction of optical material of the disk varies sharply at wavelengths shorter than 650 nm, excessive aberration occurs. Thus, there is a need for an optical system compatible with existing DVDs, and capable of effectively reducing chromatic aberration.

For a DVD-R, the reflectivity with respect to light sources other than the red light source decreases. Thus, for compatibility with DVD-Rs, a light source having a wavelength of 650 nm must also be used. However, the problem of aberration can not be eliminated from a 400 nm-objective lens by only controlling the divergence of the light emitted from the 650 nm-light source and incident on the objective lens. Thus, the critical concern in developing HD-DVD compatible systems is finding an effective chromatic aberration correction technique.

An example of a conventional objective lens capable of correcting chromatic aberration, which was described in Japanese Patent Laid-open Publication No. Hei 10-123410, is shown in FIG. 3. Referring to FIG. 3, the conventional objective lens is constructed of two lenses: a first lens 3 and a second lens 4. In particular, the first lens 3 corrects chromatic aberration and is arranged between a disk 6 and the second lens 4. The second lens 4 focuses the light. This structure allows the NA to be increased to 0.7 or more, so that such an objective lens can be employed in an optical system for high-density recording. However, the objective lens has problems in that use of two lenses increases the optical length of the system, and reproduction of the beam spots is highly sensitive to a change in the relative positions of the two lenses.

SUMMARY OF THE INVENTION

To solve the above problems, it is an objective of the present invention to an optical pickup using different short wavelength laser beams as light sources.

It is another object of the present invention to provide an optical pickup capable of effectively correcting aberration caused by a sudden change in the refractivity of optical materials.

It is still another objective of the present invention to provide an optical pickup using a laser beam of 650 nm for digital versatile disks (DVDs) and a laser beam of about 400 nm for HD-DVDs to be compatible with other optical recording media.

Additional objects and advantages of the invention will be set forth in part in the description which follows and, in part, will be obvious from the description, or may be learned by practice of the invention.

According to an aspect of the present invention, there is provided an optical pickup comprising a light source to generate a laser beam of 500 nm or less; an objective lens to focus the laser beam onto an optical disk; a photodetector to convert the laser beam reflected from the optical disk into an electrical signal; and a collimating lens arranged between the light source and the objective lens, including a diverging lens with diverging power and a focusing lens with focusing power, wherein, assuming that the total focal distance of the collimating lens is f and the focal distance of the diverging lens is fn, the collimating lens satisfies the relationship $-1.5 > f/fn$.

According to another aspect of the present invention, there is provided an optical pickup comprising first and second light sources, which correspond to first and second media, respectively, to generate laser beams of different wavelengths; an objective lens to focus the laser beams from the first and second light sources onto the first and second media, respectively; first and second photodetectors to receive the laser beams emitted from the first and second light sources and reflected from the first and second media, respectively; and a collimating lens arranged on the optical path of one of the laser beams having a relatively short wavelength, the collimating lens including a diverging lens with diverging power and a focusing lens with focusing power, wherein, assuming that the total focal distance of the collimating lens is f and the focal distance of the diverging lens is fn, the collimating lens satisfies the relationship $-1.5 > f/fn$.

According to another aspect of the present invention, there is provided an optical pickup comprising an objective lens selectively arranged opposite to and facing first and second media; a first light source arranged on the optical path of the objective lens; a beam splitter arranged between the objective lens and the first light source; a second light source arranged on the optical path of the light reflected from the beam splitter; a first photodetector to receive light emitted from the first light source and reflected from the first medium; a second photodetector to receive light emitted from the second light source and reflected from the second medium; and a collimating lens arranged between the objective lens and the beam splitter, the collimating lens including a diverging lens with diverging power and a focusing lens with focusing power, wherein, assuming that the total focal distance of the collimating lens is f and the focal distance of the diverging lens is fn, the collimating lens satisfies the relationship $-1.5 > f/fn$.

According to another aspect of the present invention, there is provided an optical pickup comprising an objective lens selectively arranged opposite to and facing first and second media; a first light source arranged on the optical path of the objective lens, to emit a laser beam toward the first medium; first, second and third beam splitters arranged on the optical path at predetermined positions from the first light source toward the objective lens; a second light source arranged on the optical path of the light reflected by the first beam splitter, to emit a laser beam through the first beam splitter toward the second medium; a first photodetector arranged on the optical path of the light reflected by the third beam splitter, to receive the laser beam emitted from the first light source and reflected from the first medium; a second photodetector arranged on the optical path of the light reflected by the second beam splitter, to receive the laser beam emitted from the second light source and reflected from the second medium; and a collimating lens arranged between the second and third beam splitters, the collimating lens including a diverging lens with diverging power and a focusing lens with focusing power, wherein, assuming that the total focal distance of the collimating lens is f and the focal distance of the diverging lens is fn, the collimating lens satisfies the relationship $-1.5 > f/fn$.

According to another aspect of the present invention, there is provided an optical pickup comprising an objective lens selectively arranged opposite to and facing first and second media; a first light source arranged on the optical path of the objective lens, to emit a laser beam toward the first optical disk; first, second and third beam splitters arranged on the optical path at predetermined positions from the first light source toward the objective lens; a second light source arranged on the optical path of the light reflected by the first beam splitter, to emit a laser beam through the first beam splitter toward the second medium; a first photodetector arranged on the optical path of the light reflected by the third beam splitter, to receive the laser beam emitted from the first light source and reflected from the first medium; a second photodetector arranged on the optical path of the light reflected by the second beam splitter, to receive the laser beam emitted from the second light source and reflected from the second medium; and a collimating lens arranged between the objective lens and the third beam splitter, the collimating lens including a diverging lens with diverging power and a focusing lens with focusing power, wherein, assuming that the total focal distance of the collimating lens is f and the focal distance of the diverging lens is fn, the collimating lens satisfies the relationship $-1.5 > f/fn$.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 1:
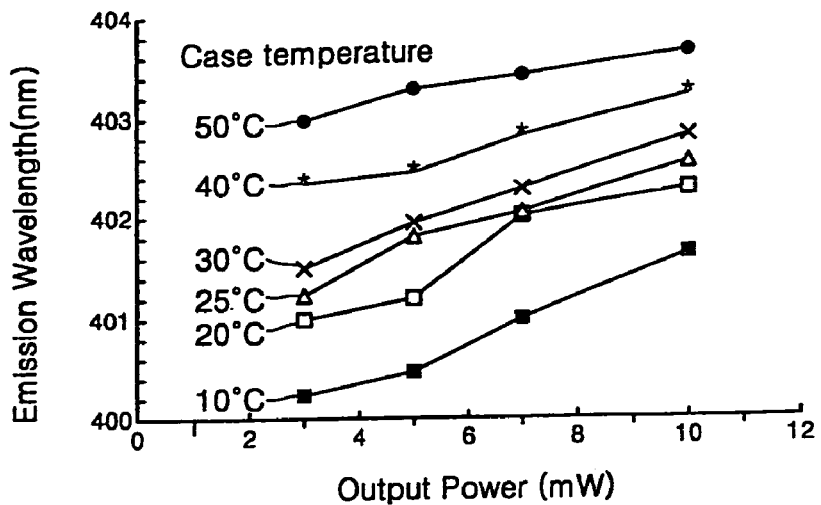
FIG. 1 is a graph showing the variation of emission wavelength of a laser diode with respect to output power at various temperatures of the laser diode case.
Figure 2:
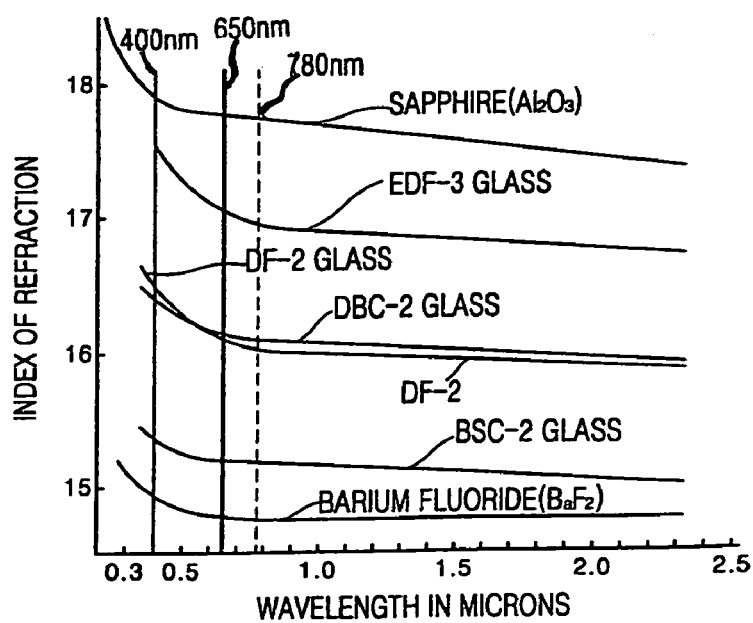
FIG. 2 is a graph showing the variation of refractive index with respect to wavelength for various optical materials.
Figure 3:
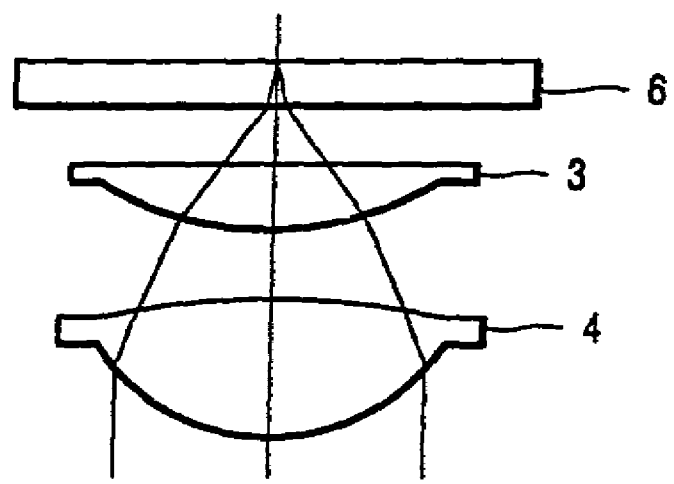
FIG. 3 is a schematic view of a conventional objective lens used for chromatic aberration correction.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
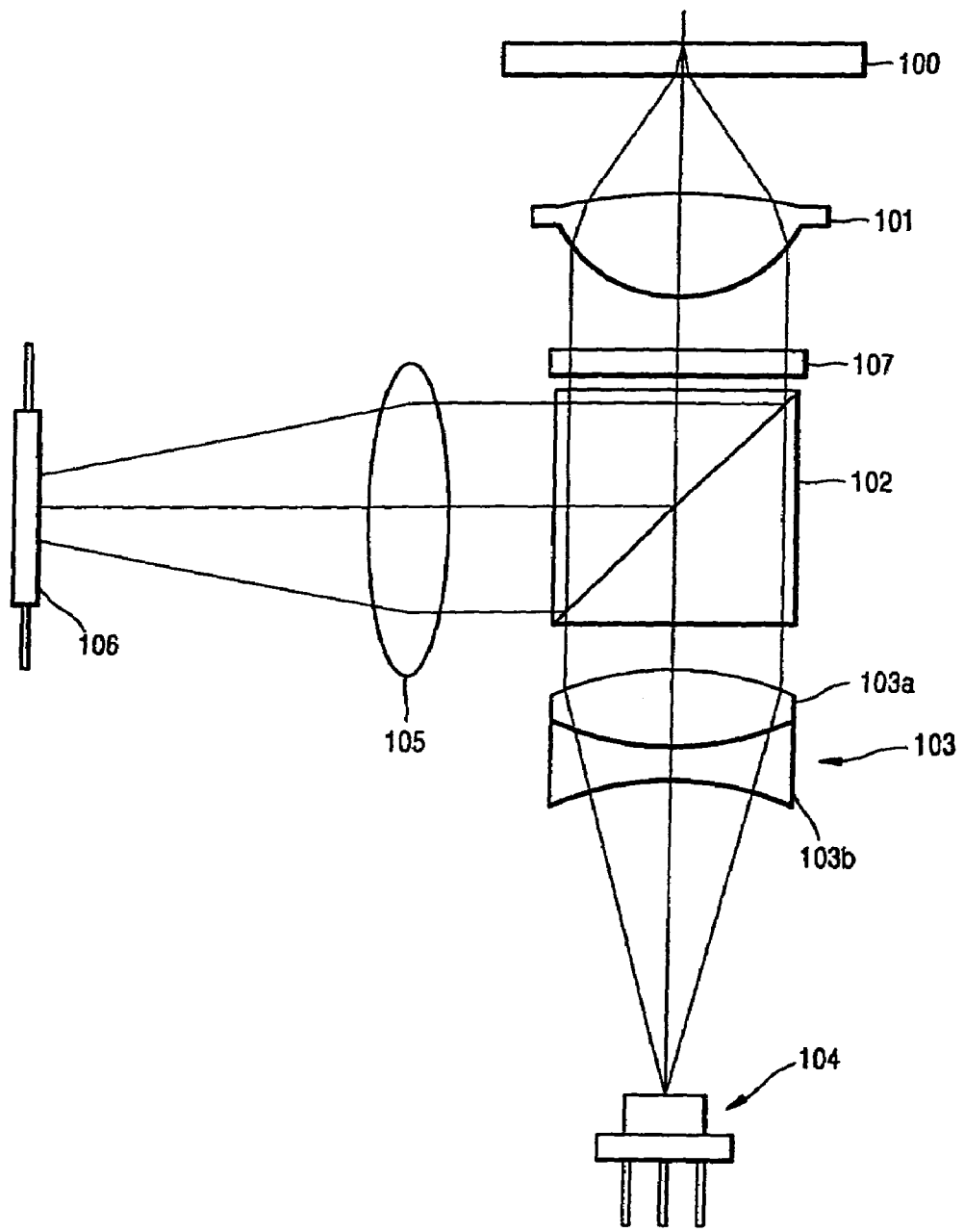
FIG. 4 is a schematic view of the optical arrangement of a first embodiment of an optical pickup according to the present invention.

A first embodiment of an optical pickup according to the present invention is shown in FIG. 4. Referring to FIG. 4, a light source 104 is positioned at the end of the optical axis of an objective lens 101 opposite a medium (optical disk) 100. A λ/4 plate 107, a beam splitter 102 and a collimating lens 103 are arranged between the objective lens 101 and the light source 104. The collimating lens 103 includes a focusing lens 103a with focusing power, and a diverging lens 103b with diverging power.

A photodetector 106 is arranged at the end of the optical path of the light reflected from the beam splitter 102, and a condensing lens 105 to condense the reflected light is positioned between the beam splitter 102 and the photodetector 106.

When the light source 104 emits a laser beam of 500 nm or less, the collimating lens 103 has the following optical characteristics: assuming that the total focal length of the collimating lens 103 is f, and the focal length of the diverging lens 103b is fn, the collimating lens 103 satisfies the relationship $-1.5 > f/fn$.

Figure 5:
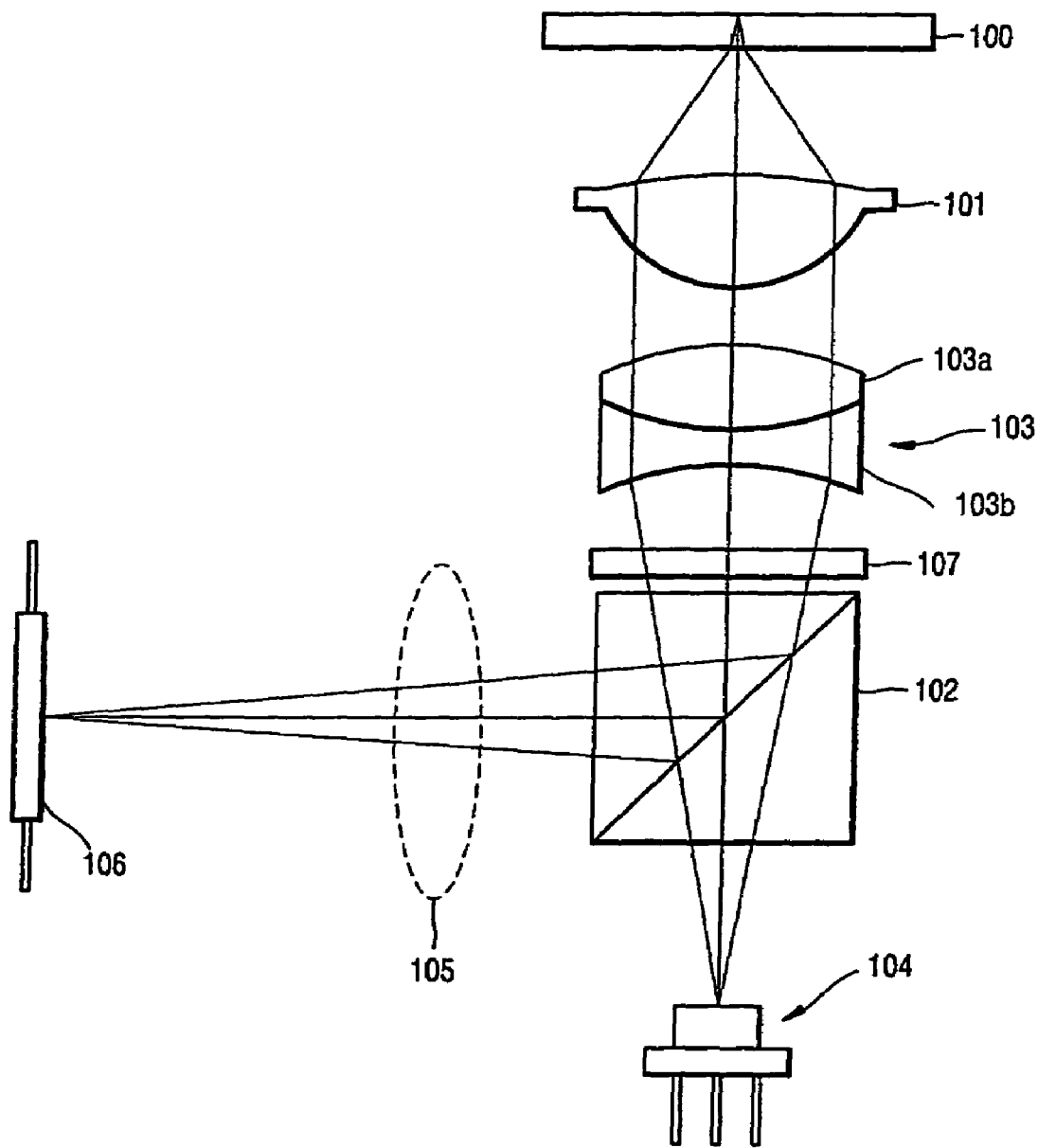
FIG. 5 is a schematic view of the optical arrangement of a second embodiment of the optical pickup according to the present invention.

A second embodiment of the optical pickup according to the present invention is shown in FIG. 5. Referring to FIG. 5, a light source 104 is positioned on the optical axis of an objective lens 101 opposite a medium (optical disk) 100. A collimating lens 103, a λ/4 plate 107, and a beam splitter 102 are arranged between the objective lens 101 and the light source 104. The collimating lens 103 includes a focusing lens 103a with focusing power, and a diverging lens 103b with diverging power.

A photodetector 106 is arranged at the end of the optical path of the light reflected from the beam splitter 102, and a condensing lens 105 for condensing the reflected light is positioned between the beam splitter 102 and the photodetector 106.

When the light source 104 emits a laser beam of 500 nm or less, the collimating lens 103 has the following optical characteristics: assuming that the focal length of the entire collimating lens 103 is f, and the focal length of the diverging lens 103b is fn, the collimating lens 103 satisfies the relationship $-1.5 > f/fn$.

The difference between the second embodiment and the first embodiment is in the position of the collimating lens 103. In the following embodiments, the design data of optical structure will be shown. The collimating lenses 103 of the previous two embodiments may have the same optical characteristics as the collimating lenses 103 of the following embodiments.

Figure 6:
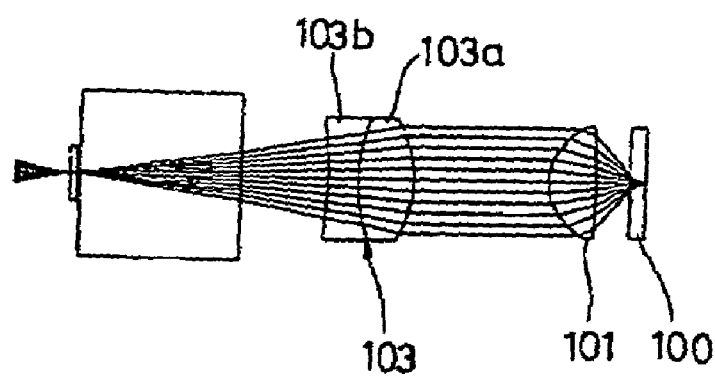
FIG. 6 illustrates the optical path of a third embodiment of the optical pickup according to the present invention.

A third embodiment of the optical pickup according to the present invention is schematically shown in FIG. 6, and the optical data for the optical pickup of FIG. 6 is listed in Table 1.

TABLE 1

| Surface | Curvature Radius | Thickness | Name of Glass |
|---|---|---|---|
| Object Surface | Infinity | 0.100000 | |
| s1 | Infinity | 6.250000 | BK7 |
| s2 | Infinity | 3.000000 | |
| s3 | −15.219848 | 1.000000 | FDS1 |
| s4 | 5.866928 | 2.000000 | TAC8 |
| s5 | −4.118685 | 5.000000 | |
| s6 | 1.770182 | 1.802215 | BACD5 |
| STOP | K: −0.721945 | | |
| | A: 0.537259E−02 B: 0.183575E−03 C: 0.85500E−04 | | |
| | D: −.121341E−04 | | |
| s7 | −11.452471 | 1.272566 | |
| | K: −179.717593 | | |
| | A: 0.222258E−02 B: −.194835E−03 C: −.172951E−04 | | |
| | D: 0.399488E−05 | | |
| s8 | Infinity | 0.600000 | 'CG' |
| s9 | Infinity | 0.000000 | |
| Image Surface | Infinity | 0.000000 | |
| Equation of Aspheric Surface (see Formula (2) hereinbelow) | | | |
| Refractivity/Abbe's Number on d-line, ν | | BACD5: 1.606048/61.3 | |
| | | FDS1: 2.012371/20.9 | |
| | | TAC8: 1.752798/54.7 | |
| | | BK7: 1.530849/64.2 | |
| | | 'CG': 1.623343/31.0 | |
| Diameter of Entrance Pupil (mm) | | 4.0 | |
| Wavelength (nm) | | 400 | |
| Focal Length of Diverging and Focusing Components of the Collimating Lens (mm) | | −4.085/3.517 | |

TABLE 1-continued

| | |
|---|---|
| Focal Length of Entire Collimating Lens (mm) | 10.0 |
| Focal Length of Objective Lens (mm) | 2.667 |
| Σ 1/(fi · vi) | −0.0004 |

Figure 7:
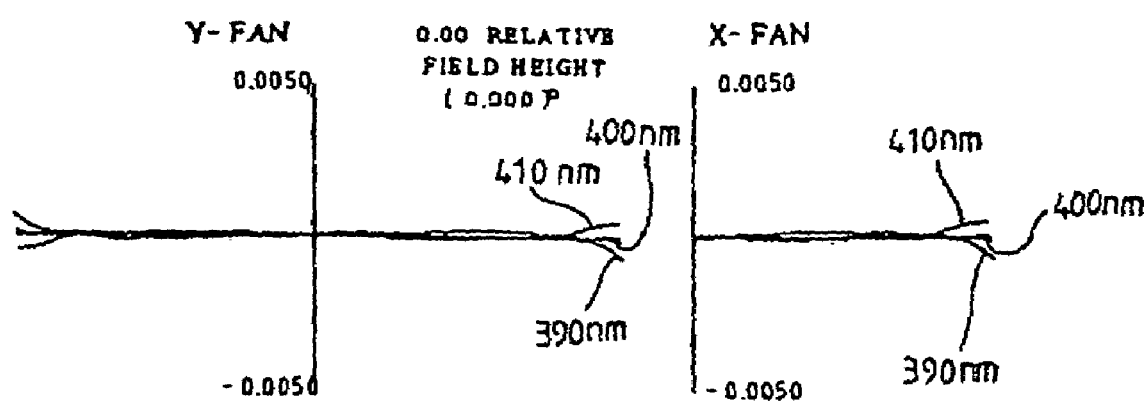
FIG. 7 illustrates aberration in the optical pickup of FIG. 6.

In the third embodiment, a light source of 400 nm, a collimating lens 103 having a focal length of 10 mm, and an objective lens 101 having an NA of 0.75 are employed. The resulting aberration in the optical pickup is shown in FIG. 7.

Figure 8:
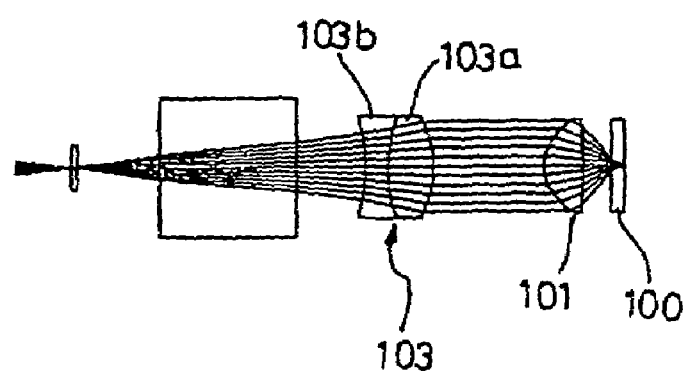
FIG. 8 illustrates the optical path of a fourth embodiment of the optical pickup according to the present invention.

A fourth embodiment of the optical pickup according to the present invention is schematically shown in FIG. 8, and the optical data for the optical pickup of FIG. 8 is listed in Table 2.

TABLE 2

| Surface | Curvature Radius | Thickness | Name of Glass |
|---|---|---|---|
| Object Surface | Infinity | 3.680296 | |
| s1 | Infinity | 6.250000 | BK7 |
| s2 | Infinity | 3.000000 | |
| s3 | −7.765552 | 1.000000 | FDS1 |
| s4 | 5.998733 | 2.000000 | NBFD12 |
| s5 | −4.527848 | 5.000000 | |
| s6 | 1.770182 | 1.802215 | BACD5 |
| STOP | K: −0.721945 | | |
| | A: 0.537259E−02 B: 0.183575E−03 C: 0.85500E−04 | | |
| | D: −.121341E−04 | | |
| s7 | −11.452471 | 1.272566 | |
| | K: −179.717539 | | |
| | A: 0.222258E−02 B: −.194835E−03 C: −.172951E−04 | | |
| | D: 0.399488E−05 | | |
| s8 | Infinity | 0.600000 | 'CG' |
| s9 | Infinity | 0.000000 | |
| Image Surface | Infinity | 0.000000 | |
| Equation of Aspheric Surface (See Formula (2) hereinbelow) | | | |
| Refractivity/Abbe's Number on d-line, v | BACD5: 1.606048/61.3 | | |
| | FDS1: 2.012371/20.9 | | |
| | NBFD12: 1.834057/42.3 | | |
| | BK7: 1.530849/64.2 | | |
| | 'CG': 1.623343/31.0 | | |
| Diameter of Entrance Pupil (mm) | 4.0 | | |
| Wavelength (nm) | 400 | | |
| Focal Length of Diverging and Focusing Components of Collimating Lens (mm) | −3.225/3.386 | | |
| Focal Length of Entire Collimating Lens (mm) | 10.0 | | |
| Focal Length of Objective Lens (mm) | 2.667 | | |
| Σ 1/(fi · vi) | −0.0017 | | |

Figure 9:
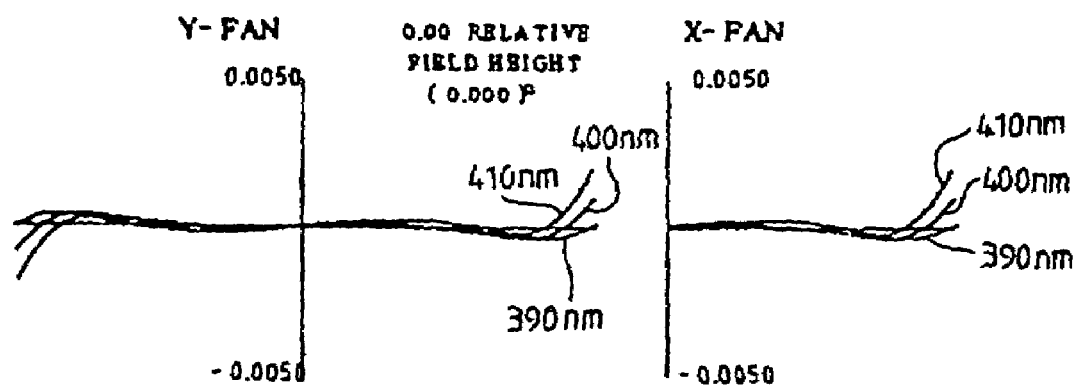
FIG. 9 illustrates aberration in the optical pickup of FIG. 8.

In the fourth embodiment, a light source of 400 nm, a collimating lens 103 having a focal length of 15 mm, and an objective lens 101 having an NA of 0.75 are employed. The resulting aberration in the optical pickup is shown in FIG. 9.

Figure 10:
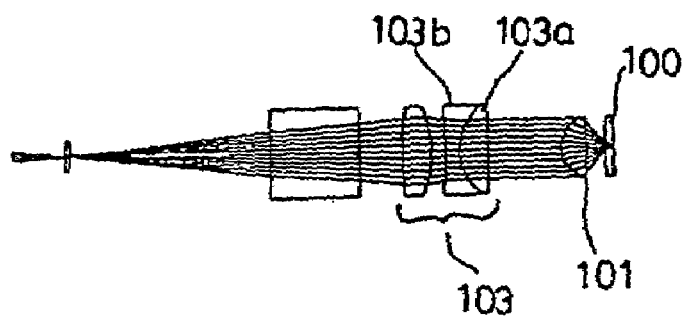
FIG. 10 illustrates the optical path of a fifth embodiment of the optical pickup according to the present invention.

A fifth embodiment of the optical pickup according to the present invention is schematically shown in FIG. 10, and the optical data for the optical pickup of FIG. 10 is listed in Table 3.

TABLE 3

| Surface | Curvature Radius | Thickness | Name of Glass |
|---|---|---|---|
| Object Surface | Infinity | 13.381632 | |
| s1 | Infinity | 6.250000 | BK7 |
| s2 | Infinity | 3.000000 | |
| s3 | 21.6695568 | 2.000000 | BACD5 |
| s4 | −7.653445 | 1.000000 | |
| s5 | −36.568237 | 1.000000 | FD4 |
| s6 | 3.690184 | 2.000000 | BACD5 |
| s7 | −49.729832 | 5.000000 | |
| s8 | 1.770182 | 1.802215 | BACD5 |

TABLE 3-continued

| | | | |
|---|---|---|---|
| STOP | K: −0.721945 | | |
| | A: 0.537259E−02 B: 0.183575E−03 C:0.85500E−04 | | |
| | D: −.121341E−04 | | |
| s9 | −11.452471 | 1.272566 | |
| | K: −179.717593 | | |
| | A: 0.222258E−02 B: −.194835E−03 C: −.172951E−04 | | |
| | D: 0.399488E−04 | | |
| s10 | Infinity | 0.600000 | 'CG' |
| s9 | Infinity | 0.000000 | |
| Image Surface | Infinity | 0.000000 | |
| Equation of Aspheric Surface (see Formula (2) hereinbelow) | | | |
| Refractivity/Abbe's Number on d-line, v | BACD5: 1.606048/61.3 | | |
| | FD4: 1.808613/27.5 | | |
| | BK7: 1.530849/64.2 | | |
| | 'CG': 1.623343/31.0 | | |
| Diameter of Entrance Pupil (mm) | 4.0 | | |
| Wavelength (nm) | 400 | | |
| Focal Length of Diverging and Focusing Components of Collimating Lens (mm) | 9.579/−4.100/5.750 | | |
| Focal Length of Entire Collimating Lens (mm) | 20.0 | | |
| Focal Length of Objective Lens (mm) | 2.667 | | |
| Σ 1/(fi · vi) | 0.0018 | | |

Figure 11:
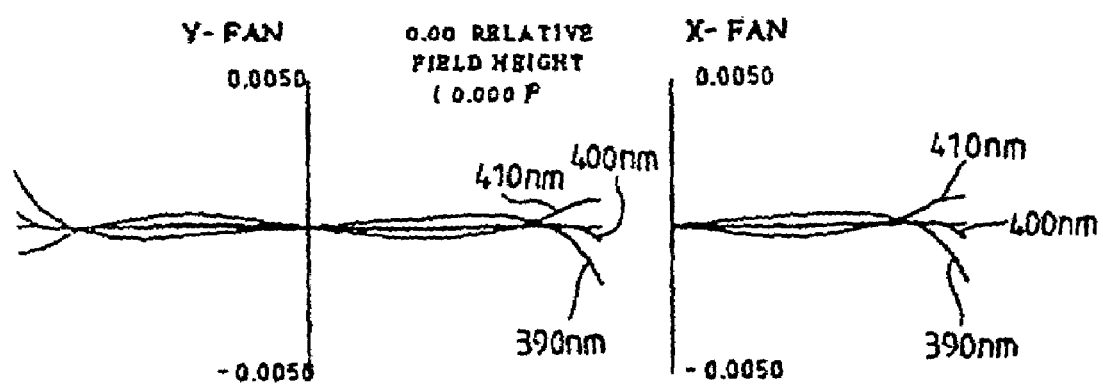
FIG. 11 illustrates aberration in the optical pickup of FIG. 10.

In the fifth embodiment, a light source of 400 nm, a collimating lens 103 having a focal length of 20 mm, and an objective lens 101 having an NA of 0.75 are employed. The resulting aberration in the optical pickup is shown in FIG. 11.

The equation of an aspheric surface, which was previously mentioned in Tables 1 through 3, is expressed by the formula (2):

$$z = \frac{ch^2}{1 + \sqrt{1 - (1+k)c^2h^2}} + Ah^4 + Bh^6 + Ch^8 + Dh^{10} + Eh^{12} + Fh^{14} \quad (2)$$

where z is depth from the vertex of the surface, h is distance from the optical axis, c is curvature, K is a conic coefficient, and A, B, C and D are aspheric coefficients.

For the third, fourth, and fifth embodiments, since the wavelength of light emitted from the light source varies in the error range of ±10 nm, the degree of defocus can be expressed as an uncertainty of ±0.36 μm in the focal depth.

Figure 12:
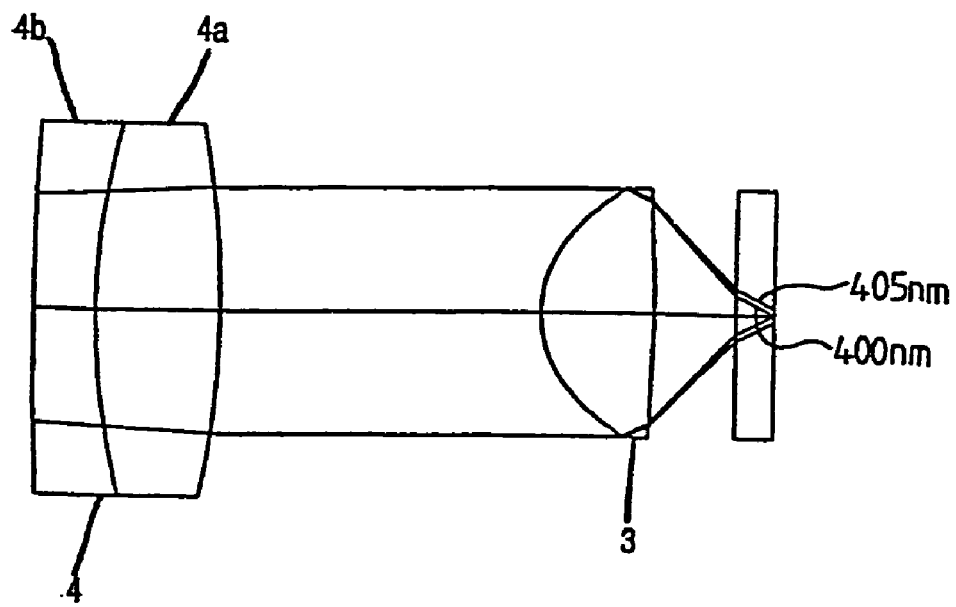
FIG. 12 illustrates the optical path of an optical pickup using a conventional collimating lens.
Figure 13:
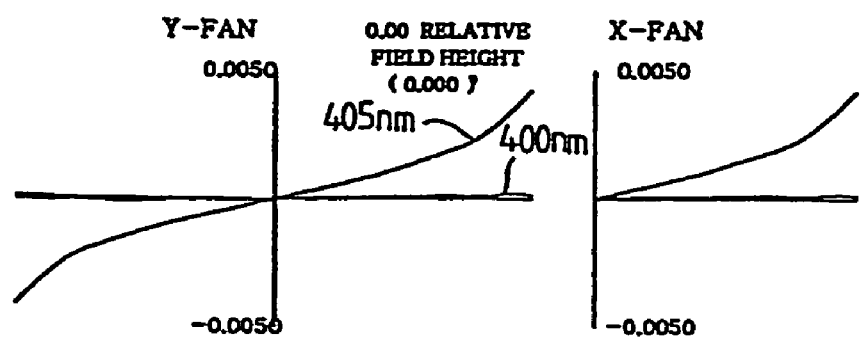
FIG. 13 illustrates aberration in the conventional optical pickup of FIG. 12.

FIG. 12 illustrates the optical path of an optical pickup using a conventional collimating lens 4, and FIG. 13 illustrates aberration in the conventional optical pickup of FIG. 12.

Figure 14:
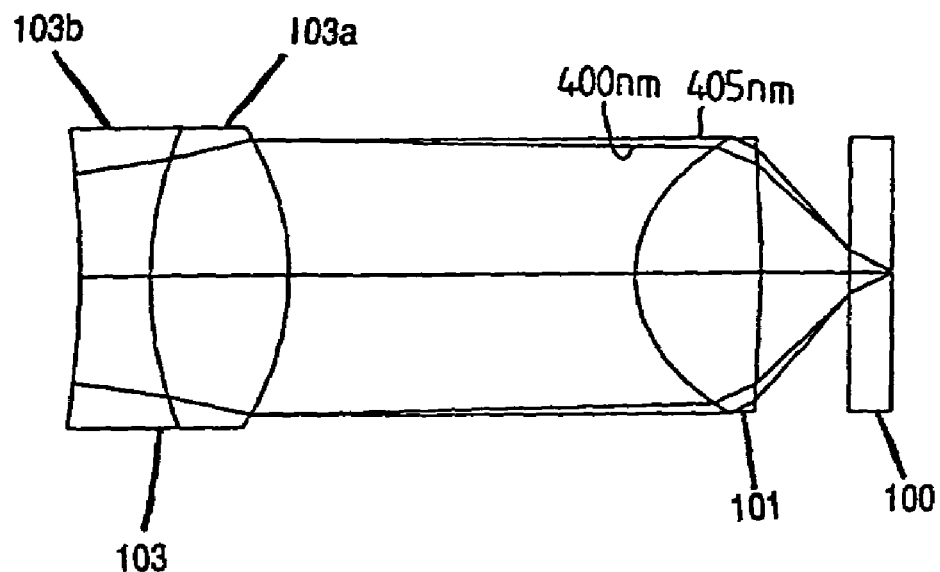
FIG. 14 illustrates the optical path of an optical pickup using a collimating lens according to the present invention.
Figure 15:
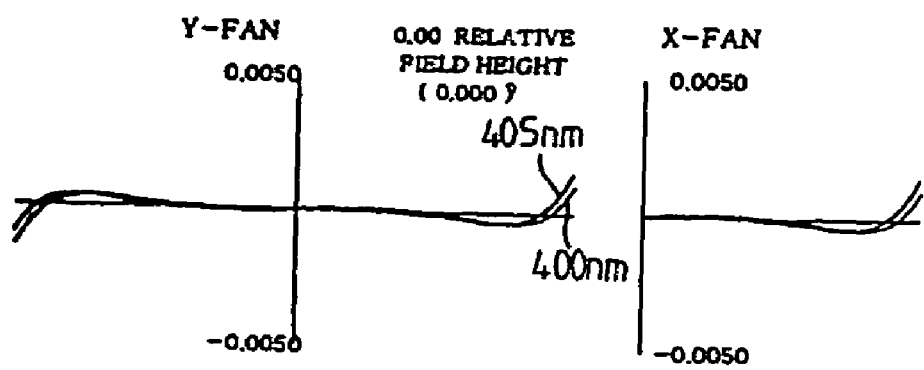
FIG. 15 illustrates aberration in the optical pickup of FIG. 14.

In contrast, FIG. 14 illustrates the optical path of an optical pickup using a collimating lens 103 according to the present invention, and FIG. 15 illustrates aberration in the optical pickup of FIG. 14.

As shown in FIGS. 12 and 13, because the conventional collimating lens 4 was designed to be suitable for a wavelength of 500 nm or more, the diverging power thereof is not sufficient to effectively correct chromatic aberration caused by a light beam having a wavelength shorter than 500 nm. For the optical pickup shown in FIG. 12, the focal lengths of lenses 4b, 4a, and 3 are −15.646, 8.999 and 2.667, the Abbe's numbers thereof are 43.0, 53.9 and 62.3, respectively, and Σ1/(fi·vi)=0.0067. As shown in FIG. 13, the resulting aberration for 400 nm light is negligible for the optical pickup, but the degree of aberration sharply increases for 405 nm light. Thus, the conventional collimating lens 4 cannot be used for short wavelength light.

Meanwhile, as shown in FIGS. 14 and 15, a variation of the degree of aberration between 400 nm and 405 nm emission beams is less for collimating lens 103 according to the present invention. Because the collimating lens 103 has a high focusing power, aberration can be effectively corrected. As a result, a light spot can be focused onto the medium within the range of a focal depth in response to a variation of the wavelength of emission light.

For a more effective reduction of chromatic aberration with respect to such short wavelength light beams, assuming that the focal length of the entire collimating lens 103 is f and the focal length of the diverging lens 103b is fn, the collimating lens 103 should satisfy the relationship $-1.5 > f/fn$.

Preferably, assuming that the front focal lengths of the lenses, which constitute the optical pickup, are f1, f2, ..., and fn, arranged from the light source toward the medium, and the Abbe's numbers on the d-line of the optical materials for the lenses is v1, v2, ..., and vn, the optical pickup satisfies the relationship $-0.005 < 1/(f1 \cdot v1) + 1/(f2 \cdot v2) + \ldots + 1/(fn \cdot vn) < 0.0005$.

An optical pickup using two light sources will be described in the following embodiments.

Figure 16:
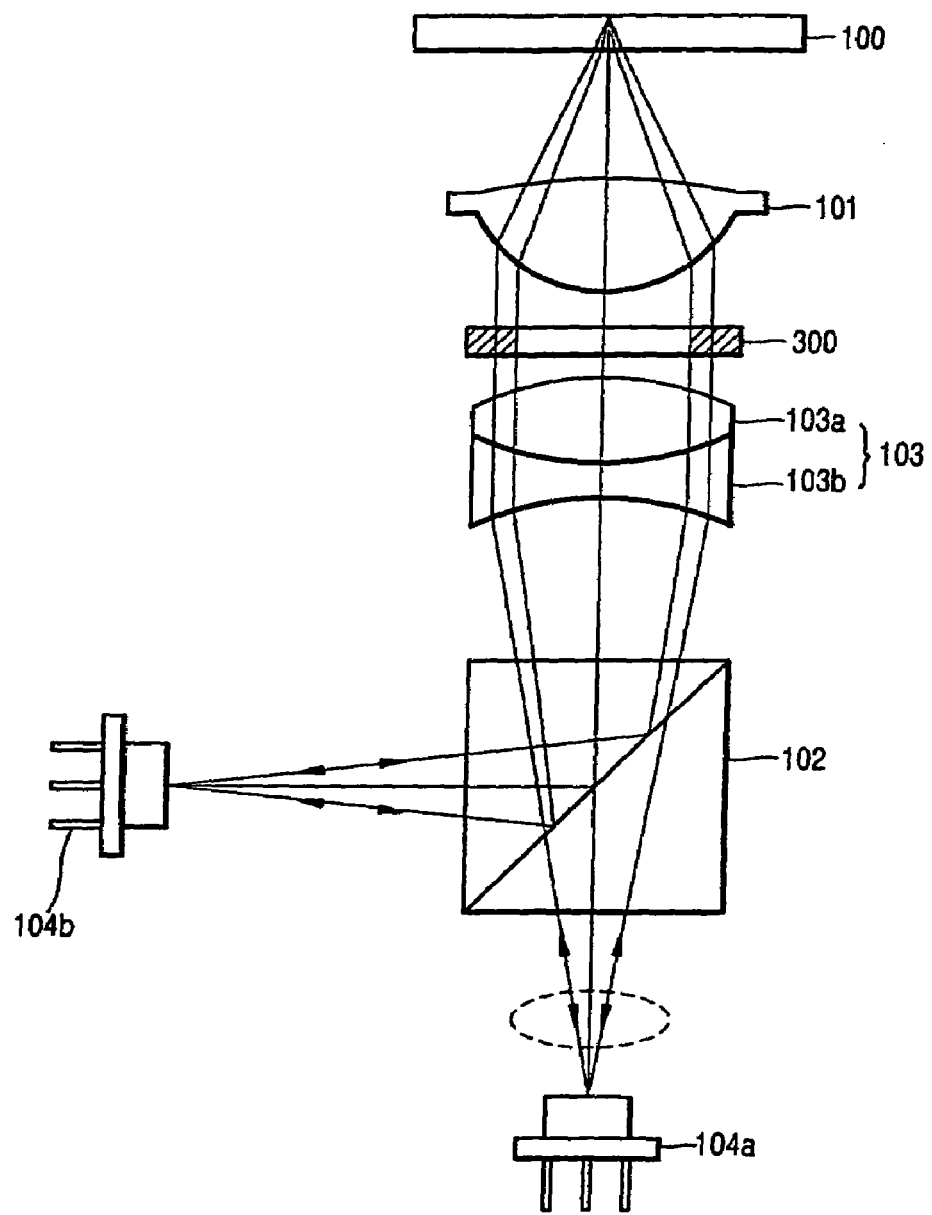
FIG. 16 is a schematic view of the optical arrangement of a sixth embodiment of an optical pickup according to the present invention.

Referring to FIG. 16, a first light source 104a is positioned at the end of the optical axis of an objective lens 101 opposite a medium 100. A wavelength selecting filter 300, to control the NA of the objective lens 101, a collimating lens 103, and a beam splitter 102 are arranged between the objective lens 101 and the first light source 104a.

The beam splitter 102 transmits the laser beam emitted from the first light source 104a, and reflects the laser beam emitted from a second light source 104b. As shown in FIG. 16, the second light source 104b is arranged on the optical path of the light reflected from the beam splitter 102.

The use of the wavelength selecting filter 300 is optional. The wavelength selecting filter 300 is incorporated into the optical pickup when there is a need for separately controlling NA for the first and second light sources 104a and 104b. For example, if the first light source 104a emits a 400 nm blue laser beam and needs an NA of 0.7, and the second light source 104b emits a 650 nm red laser beam and needs an NA of 0.6, the wavelength selecting filter 300 is employed to reduce the NA of the objective lens 101 to 0.6 for the 650 nm laser beam, while transmitting all of the 400 nm laser beam.

A conventional light emitter/detector device, which includes a photodetector and a laser diode, may be used as the first and second light sources 104a and 104b, so that a laser beam may be emitted and received by the same device.

The collimating lens 103 of the present invention includes a focusing lens 103a with focusing power, and a diverging lens 103b with diverging power. Assuming that the focal length of the entire collimating lens 103 is f and the focal length of the diverging lens 103b is fn, the collimating lens 103 satisfies the relationship $-1.5 > f/fn$. The collimating lens 103 collimates the laser beams from the first and second light sources 104a and 104b, while helping correct chromatic aberration.

Figure 17:
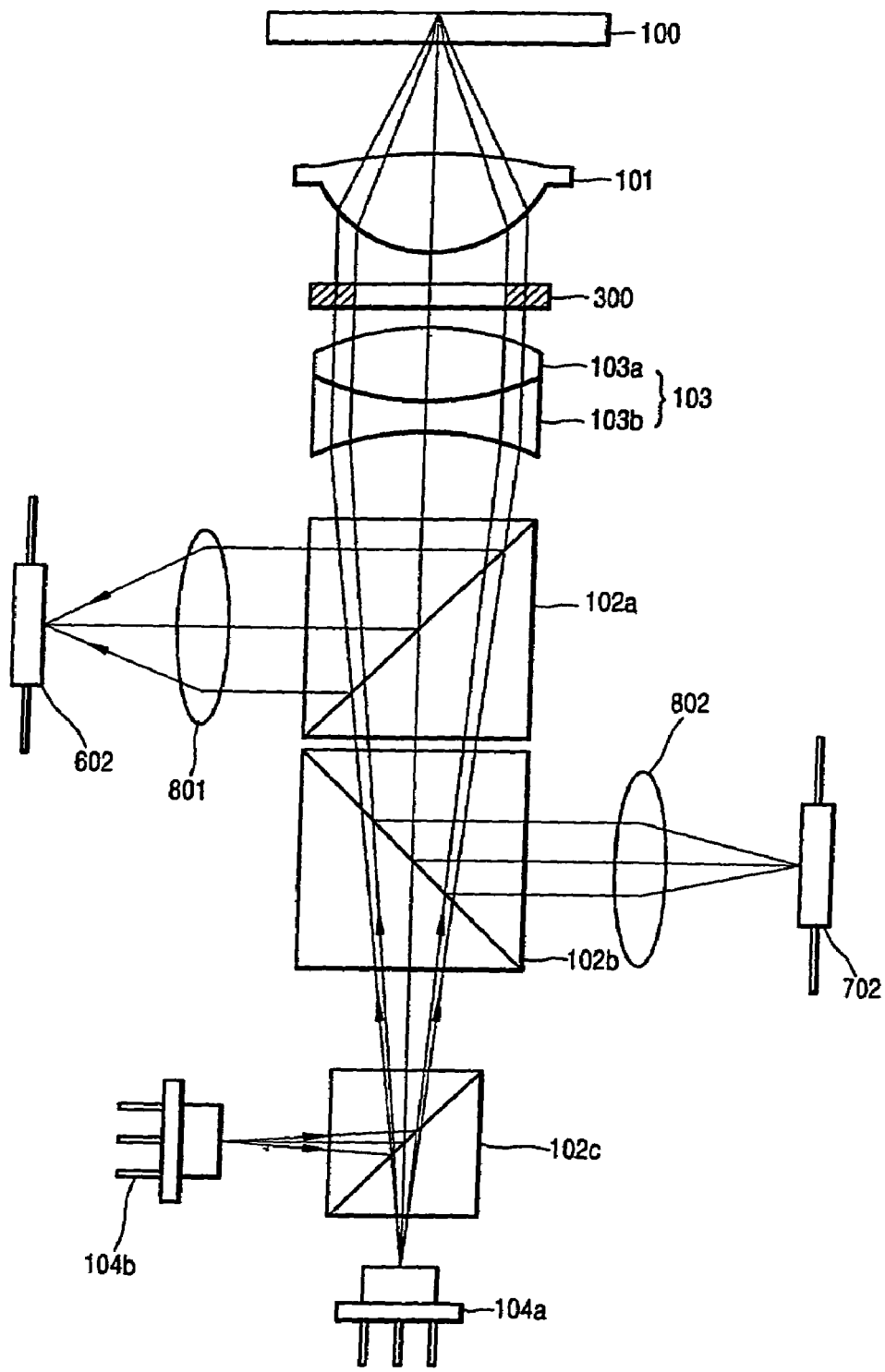
FIG. 17 is a schematic view of the optical arrangement of a seventh embodiment of the optical pickup according to the present invention.

Referring to FIG. 17, a first light source 104a is positioned at the end of the optical axis of an objective lens 101 opposite a medium 100. A wavelength selecting filter 300 to control the NA of the objective lens 101, a collimating lens 103, and first, second and third beam splitters 102a, 102b and 102c are arranged at predetermined positions between the objective lens 101 and the first light source 104a.

The third beam splitter 102c transmits the laser beam from the first light source 104a, and reflects the laser beam from a second light source 104b toward the medium 100. As shown in FIG. 17, the second light source 104b is arranged on the optical path of the light reflected from the third beam splitter 102c.

The second beam splitter 102b transmits both of the laser beams from the first and second light sources 104a and 104b, and reflects the light reflected from the medium 100 that originated from the second light source 104b. The light reflected by the medium 100 and the second beam splitter 102b is condensed by a second condensing lens 802 onto a second photodetector 702.

The first beam splitter 102a transmits both of the laser beams from the first and second light sources 104a and 104b toward the medium 100. The first beam splitter 102a reflects the light reflected from the medium 100 that originated from the first light source 104a, and transmits the light reflected from the medium 100 that originated from the second light source 104b. The light reflected by the medium 100 and by the first beam splitter 102a is condensed by a first condensing lens 801 onto a first photodetector 602.

The use of the wavelength selecting filter 300 is optional. The wavelength selecting filter 300 is incorporated into the optical pickup when there is a need for separately controlling NA for the first and second light sources 104a and 104b. For example, if the first light source 104a emits a 400 mm blue laser beam and needs an NA of 0.7, and the second light source 104b emits a 650 nm red laser beam and needs an NA of 0.6, the wavelength selecting filter 300 reduces the NA of the objective lens 101 to 0.6 for the 650 nm laser beam, while transmitting all of the 400 nm laser beam.

The collimating lens 103 includes a focusing lens 103a with focusing power, and a diverging lens 103b with diverging power. Assuming that the focal length of the entire collimating lens 103 is f and the focal length of the diverging lens 103b is fn, the collimating lens 103 satisfies the relationship $-1.5 > f/fn$. The collimating lens 103 collimates the laser beams from the first and second light sources 104a and 104b, and while helping correct chromatic aberration.

Figure 18:
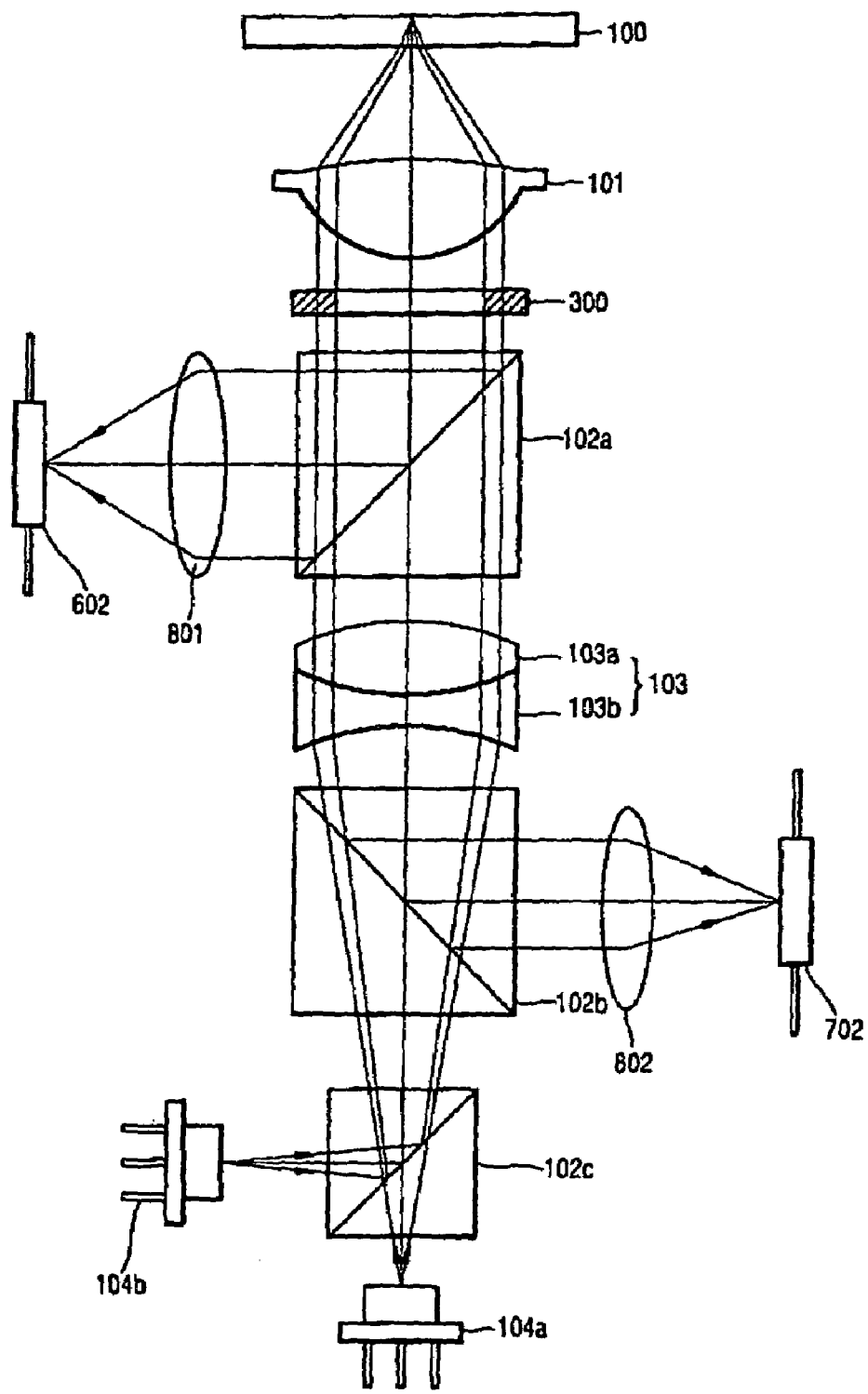
FIG. 18 is a schematic view of the optical arrangement of an eighth embodiment of an optical pickup according to the present invention.

Referring to FIG. 18, a first light source 104a is positioned at the end of the optical axis of an objective lens 101 opposite a medium 100. A wavelength selecting filter 300 to control the NA of the objective lens 101, and first, second and third beam splitters 102a, 102b and 102c are arranged at predetermined positions between the objective lens 101 and the first light source 104a. A collimating lens 103 is positioned between the first and second beam splitters 102a and 102b.

The third beam splitter 102c transmits the laser beam from the first light source 104a and reflects the laser beam from a second light source 104b toward the medium 100. The second light source 104b is arranged on the optical path of the light reflected from the third beam splitter 102c.

The second beam splitter 102b transmits all of the laser beams from the first and second light sources 104a and 104b, and reflects the light reflected from the medium 100 that originated from the second light source 104b. The light reflected by the medium 100 and by the second beam splitter 102b is condensed by a second condensing lens 802 onto a second photodetector 702.

The first beam splitter 102a transmits all of the laser beams from the first and second light sources 104a and 104b toward the medium 100. The first beam splitter 102a reflects the light reflected from the medium 100 that originated from the first light source 104a, and transmits the light reflected from the medium 100 that originated from the second light source 104b. The light reflected by the medium 100 and by the first beam splitter 102a is condensed by a first condensing lens 801 onto a first photodetector 602.

The use of the wavelength selecting filter 300 is optional. The wavelength selecting filter 300 is incorporated into the optical pickup when there is a need for separately controlling NA for the first and second light sources 104a and 104b. For example, if the first light source 104a emits a 400 nm blue laser beam and needs an NA of 0.7, and the second light source 104b emits a 650 nm red laser beam and needs an NA of 0.6, the wavelength selecting filter 300 is employed to allow a reduction of the NA of the objective lens 101 to 0.6 for the 650 nm laser beam while transmitting all of the 400 nm laser beam.

The collimating lens 103 includes a focusing lens 103a with focusing power, and a diverging lens 103b with diverging power. Assuming that the focal length of the entire collimating lens 103 is f and the focal length of the diverging lens 103b is fn, the collimating lens 103 satisfies the relationship −1.5>f/fn. The collimating lens 103 collimates the laser beams from the first and second light sources 104a and 104b, and while helping correct chromatic aberration.

Figure 19:
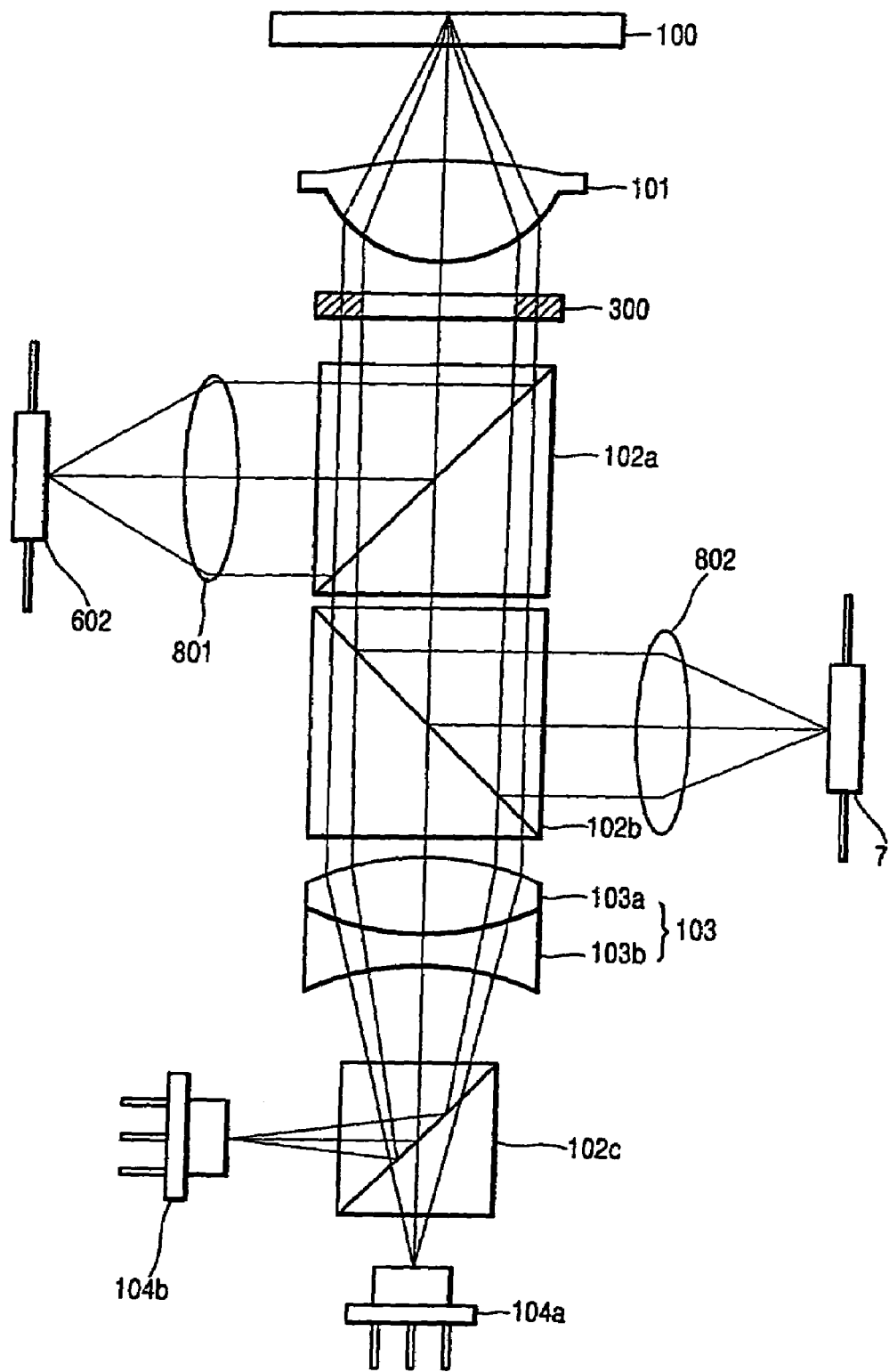
FIG. 19 is a schematic view of the optical arrangement of a ninth embodiment of the optical pickup according to the present invention.

Referring to FIG. 19, a first light source 104a is positioned at the end of the optical axis of an objective lens 101 opposite a medium 100. A wavelength selecting filter 300 to control the NA of the objective lens 101, and first, second and third beam splitters 102a, 102b and 102c are arranged at predetermined positions between the objective lens 101 and the first light source 104a. A collimating lens 103 is positioned between the second and third beam splitters 102b and 102c.

The third beam splitter 102c transmits the laser beam from the first light source 104a, and reflects the laser beam from a second light source 104b toward the medium 100. As shown in FIG. 19, the second light source 104b is arranged on the optical path of the light reflected from the third beam splitter 102c.

The second beam splitter 102b transmits all of the laser beams from the first and second light sources 104a and 104b, and reflects the light reflected from the medium 100 that originated from the second light source 104b. The light reflected by the medium 100 and by the second beam splitter 102b is condensed by a second condensing lens 802 onto a second photodetector 702.

The first beam splitter 102a transmits all of the laser beams from the first and second light sources 104a and 104b toward the medium 100. The first beam splitter 102a reflects the light reflected from the medium 100 that originated from the first light source 104a, and transmits the light reflected from the medium 100 that originated from the second light source 104b. The light reflected by the medium 100 and by the first beam splitter 102a is condensed first condensing lens 801 onto a first photodetector 602.

The use of the wavelength selecting filter 300 is optional. The wavelength selecting filter 300 is incorporated into the optical pickup when there is a need for separately controlling NA for the first and second light sources 104a and 104b. For example, if the first light source 104a emits a 400 nm blue laser beam and needs an NA of 0.7, and the second light source 104b emits a 650 nm red laser beam and needs an NA of 0.6, the wavelength selecting filter 300 is employed to allow a reduction of the NA of the objective lens 101 to 0.6 for the 650 nm laser beam while transmitting all of the 400 nm laser beam.

The collimating lens includes a focusing lens 103a with focusing power, and a diverging lens 103b with diverging power. Assuming that the focal length of the entire collimating lens 103 is f and the focal length of the diverging lens 103b is fn, the collimating lens 103 satisfies the relationship −1.5>f/fn. The collimating lens 103 collimates the laser beams from the first and second light sources 104a and 104b, and while helping correct chromatic aberration.

Figure 20:
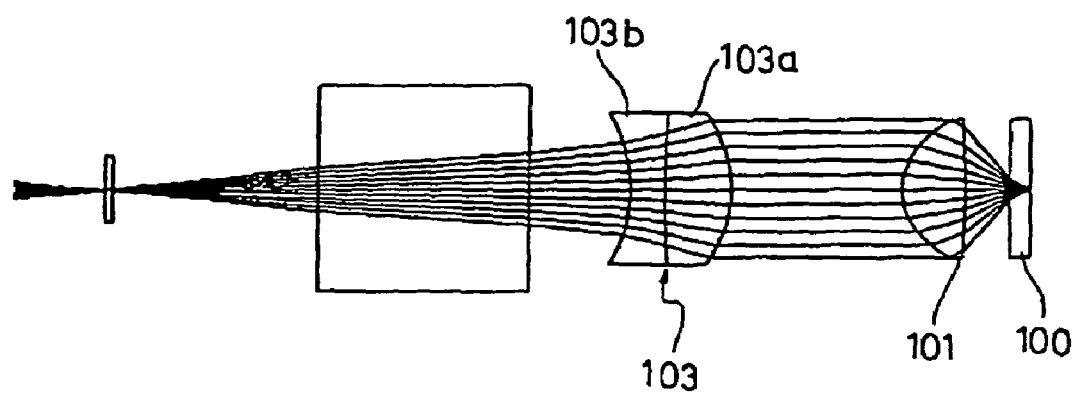
FIG. 20 illustrates the optical path of light having a wavelength of 405 nm in the optical pickup according to the present invention.
Figure 22:
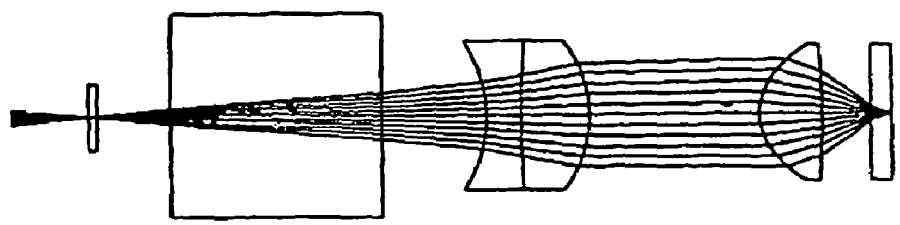
FIG. 22 illustrates the optical path of light having a wavelength of 650 nm in the optical pickup according to the present invention.

A tenth embodiment of the optical pickup according to the present invention is schematically shown in FIGS. 20 and 22, and the optical data for the optical pickup of FIGS. 20 and 22 is listed in Table 4.

TABLE 4

| Surface | Curvature Radius | Thickness | Name of Glass |
|---|---|---|---|
| Object Surface | Infinity | 0.100000 | |
| s1 | Infinity | 0.250000 | BK7 |
| s2 | Infinity | 5.929508z | |
| | | 2.122789z | |
| s3 | Infinity | 6.000000 | BK71 |
| s4 | Infinity | 3.000000 | |
| s5 | −4.081133 | 1.000000 | FDS1 |
| s6 | 30.164147 | 2.000000 | BACD5 |
| s7 | −3.467121 | 5.000000 | |
| | K: −0.2007701 | | |
| | A: 0.445555E−03 B: −0119205E−03 C: 0.316310E−04 | | |
| | D: −.267022E−05 | | |
| s8 | 1.770182 | 1.802215 | BACD5 |
| STOP | K: −0.721945 | | |
| | A: 0.537259E−02 B: −.183575E−03 C: −.855000E−04 | | |
| | D: −0.121341E−04 | | |
| | K: −0.721945 | | |
| | A: 0.537259E−02 B: 0.183575E−03 C: 0.855000E−04 | | |
| | D: −0.121341E−04 | | |
| s9 | −11.452471 | 1.272566 | |
| | K: −179.717539 | | |
| | A: 0.222258E−02 B: −.194835E−03 C: −.172951E−04 | | |
| | D: 0.399488E−05 | | |
| s10 | Infinity | 0.600000 | 'CG' |
| s11 | Infinity | 0.000000 | |
| Image Surface | Infinity | 0.000000 | |
| Equation of Aspheric Surface (see Formula (2) hereinabove) | | | |
| Refractivity/Abbe's Number on d-line, v | | BK7: 1.514520 at 650 nm/ | |
| | | 1.530849 at 400 nm/64.2 | |
| | | FDS1: 1.911294 at 650 nm/ | |
| | | 2.012371 at 400 nm/20.9 | |
| | | TAC8: 1.725425 at 650 | |
| | | nm/1.752798 at 400 | |
| | | nm/54.7 | |
| | | BACD5: 1.586422 at 650 | |
| | | nm/1.606048 at 400 | |
| | | nm/61.3 | |
| | | 'CG': 1.581922 at 650 nm/ | |
| | | 1.623343 at 400 nm/31.0 | |
| Diameter of Entrance Pupil (mm) | | 4.0 | |
| Wavelength (nm) | | 400, 650 | |
| Focal Length of Diverging and Focusing Components of Collimating Lens (mm) | | −3.499/4.239 at 400 nm | |
| Focal Length of Entire Collimating Lens (mm) | | 19.995 at 400 nm | |
| Focal Length of Objective Lens (mm) | | 2.667 at 400 nm | |
| Σ 1/(fi · vi) | | −0.0032 | |

In the tenth embodiment, a light source of 400 nm, a collimating lens 103 having a focal length of about 20 mm, and an objective lens 101 having an NA of 0.75 are employed. Since the wavelength of light emitted from the light source varies in the error range of ±5 nm, the degree of defocus can be expressed as an uncertainty of ±0.36 μm in the focal depth. Also, the optical distance at 650 nm is 0.012λ.

Figure 21:
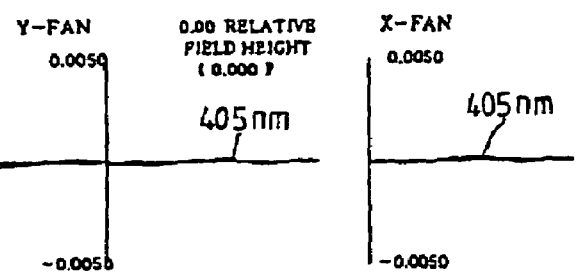
FIG. 21 illustrates aberration in the optical pickup of FIG. 20.

FIG. 20 illustrates the optical path of light having a wavelength of 400 nm in the optical pickup according to the present invention, and FIG. 21 illustrates the resulting aberration in the optical pickup of FIG. 20.

Figure 23:
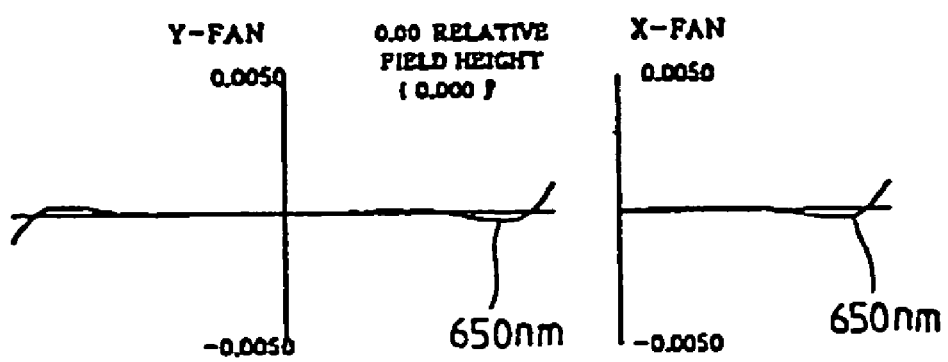
FIG. 23 illustrates aberration in the optical pickup of FIG. 22.

FIG. 22 illustrates the optical path of light having a wavelength of 650 nm in the optical pickup according to the present invention, and FIG. 23 illustrates the resulting aberration in the optical pickup of FIG. 22. In particular, FIG. 24 comparatively illustrates the aberration of 400 nm and 401 nm light in the optical pickup of FIG. 20.

Figure 24:
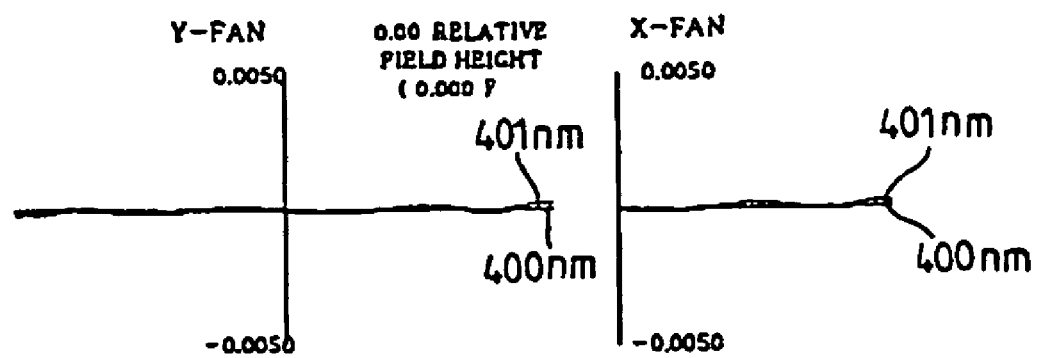
FIG. 24 illustrates aberration in the optical pickup of FIG. 20, for 400 nm light and for 401 and 405 nm light.

As shown in FIG. 24, the difference in the aberration of 400 nm light and 405 nm light is hardly detected in the optical pickup according to the present invention. Since the collimating lens 103 according to the present invention has a high focusing power, the aberration can be effectively corrected. As a result, a light spot can be focused onto a medium within the range of a focal depth in response to variation of the wavelength of emission light.

For a more effective reduction of chromatic aberration with respect to such short wavelength light beams, assuming that the focal length of the entire collimating lens 103 is f and the focal length of the diverging lens 103b is fn, the collimating lens 103 should satisfy the relationship −1.5>f/fn.

Preferably, assuming that the front focal lengths of the lenses that comprise the optical pickup, are f1, f2, . . . , and fn, arranged from the light source toward the medium, and the Abbe's numbers on the d-line of the optical materials of the lenses are v1, v2, . . . , and vn, the optical pickup satisfies the following relationship:

$$-0.005<1/(f1\cdot v1)+1/(f2\cdot v2)+ \ldots +1/(fn\cdot vn)<0.0005.$$

The optical pickup according to the present invention is compatible with both existing DVDs, and HD-DVDs, which require a blue light source near 405 nm and an objective lens having an NA of 0.6 (the specification thereof is not standardized yet). The optical pickup according to the present invention ensures high-density information reading and recording using an objective lens having a high NA and a light source with a short wavelength of 500 nm or less. In particular, the collimating lens having the configuration explained above contributes to high-density reading and recording by effectively correcting chromatic aberration with respect to short wavelength blue laser light.

In addition, it is understood that the collimating lens can be used in other optical systems, such as microscopes, in order to reduce optical aberrations.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup comprising:
   a light source to generate a laser beam of 500 nm or less;
   an objective lens to focus the laser beam onto a medium;
   a photodetector to convert the laser beam reflected from the medium into an electrical signal; and
   a collimating lens arranged between said light source and said objective lens, including a diverging lens with diverging power and a focusing lens with focusing power,
   wherein said collimating lens satisfies the relationship −1.5>f/fn, where f is a total focal length of said collimating lens, and fn is a focal length of the diverging lens.

2. The optical pickup of claim 1, further comprising a beam splitter between said objective lens and said photodetector, to transmit the laser beam from said light source toward the medium through said objective tens, and to reflect the laser beam reflected from the medium toward said photodetector.

3. The optical pickup of claim 2, wherein said collimating lens is arranged between said beam splitter and said light source.

4. The optical pickup of claim 2, wherein said collimating lens is arranged between said objective lens and said beam splitter.

5. The optical pickup of claim 4, wherein the optical pickup satisfies the relationship −0.005<1/(f1·v1)+1/(f2·v2)+ . . . +1/(fn·vn)<0.0005, where
   f1, f2, . . . , and fn are focal lengths of respective lenses, including said objective and collimating lenses, from said light source toward the medium, and
   v1, v2, . . . , and vn, are Abbe's numbers of optical materials of the respective lenses.

6. The optical pickup of claim 2, further comprising a condensing lens between said photodetector and said beam splitter, to condense the laser beam reflected from the medium onto said photodetector.

7. The optical pickup of claim 6, wherein said collimating lens is arranged between said beam splitter and said light source.

8. The optical pickup of claim 7, wherein the optical pickup satisfies the relationship −0.005<1/(f1·v1)+1/(f2·v2)+ . . . +1/(fn·vn)<0.0005, where
   f1, f2, . . . , and fn are focal lengths of respective lenses, including said objective and collimating lenses, from said light source toward the medium, and
   v1, v2, . . . , and vn, are Abbe's numbers of optical materials of the respective lenses.

9. The optical pickup of claim 6, wherein said collimating lens is arranged between said objective lens and said beam splitter.

10. The optical pickup of claim 9, wherein the optical pickup satisfies the relationship −0.005<1/(f1·v1)+1/(f2·v2)+ . . . +1/(fn·vn)<0.0005, where
    f1, f2, . . . , and fn are focal lengths of respective lenses, including said objective and collimating lenses, from said light source toward the medium, and
    v1, v2, . . . , and vn, are Abbe's numbers of optical materials of the respective lenses.

11. The optical pickup of claim 2, wherein the optical pickup satisfies the relationship −0.005<1/(f1·v1)+1/(f2·v2)+ . . . +1/(fn·vn)<0.0005, where
    f1, f2, . . . , and fn are focal lengths of respective lenses, including said objective and collimating lenses, from said light source toward the medium, and
    v1, v2, . . . , and vn, are Abbe's numbers of optical materials of the respective lenses.

12. The optical pickup of claim 1, further comprising a condensing lens between said photodetector and said beam splitter, to condense the laser beam reflected from the medium onto said photodetector.

13. The optical pickup of claim 12, wherein said collimating lens is arranged between said beam splitter and said light source.

14. The optical pickup of claim 13, the optical pickup satisfies the relationship −0.005<1/(f1·v1)+1/(f2·v2)+ . . . +1/(fn·vn)<0.0005, where
    f1, f2, . . . , and fn are focal lengths of respective lenses, including said objective and collimating lenses, from said light source toward the medium, and
    v1, v2, . . . , and vn, are Abbe's numbers of optical materials of the respective lenses.

15. The optical pickup of claim 12, wherein said collimating lens is arranged between said objective lens and said beam splitter.

16. The optical pickup of claim 15, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the medium, and v1, v2, ..., and vn, are Abbe's numbers of optical materials of the respective lenses.

17. The optical pickup of claim 1, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the medium, and v1, v2, ..., and vn, are Abbe's numbers of optical materials of the respective lenses.

18. The optical pickup of claim 1, wherein said light source emits the laser beam having a wavelength of about 400 nm.

19. An optical pickup comprising:

first and second light sources, which correspond to first and second media, respectively, to generate laser beams of different wavelengths;

an objective lens to focus the laser beams from said first and second light sources onto the first and second media, respectively;

first and second photodetectors to receive the laser beams emitted from said first and second light sources and reflected from the first and second media, respectively; and a collimating lens arranged on the optical path of one of the laser beams having a relatively short wavelength, said collimating lens including a diverging lens with diverging power and a focusing lens with focusing power, wherein said collimating lens satisfies the relationship $-1.5>f/fn$, where f is a total focal length of said collimating lens, and fn is a focal length of the diverging lens.

20. The optical pickup of claim 19, further comprising a wavelength selecting filter on the optical axis near said objective lens.

21. The optical pickup of claim 20, wherein said first light source emits a laser beam having a wavelength of about 400 nm, and said second light source emits a laser beam having a wavelength of about 650 nm.

22. The optical pickup of claim 21, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

23. The optical pickup of claim 20, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

24. The optical pickup of claim 20, wherein said first light source emits the laser beam having a wavelength of about 400 nm, and said second light source emits the laser beam having a wavelength of about 650 nm.

25. The optical pickup of claim 19, wherein said first light source emits a laser beam having a wavelength of about 400 nm, and said second light source emits a laser beam having a wavelength of about 650 nm.

26. The optical pickup of claim 25, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

27. The optical pickup of claim 19, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

28. The optical pickup of claim 19, wherein said first light source emits a laser beam having a wavelength of about 400 nm, and said second light source emits a laser beam having a wavelength of about 650 nm.

29. The optical pickup of claim 19, wherein the optical pickup satisfies the relationship $-0.005<1/(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

30. An optical pickup comprising:

an objective lens selectively arranged opposite first and second media;

a first light source arranged on the optical path of said objective lens;

a beam splitter arranged between said objective lens and said first light source;

a second light source arranged on the optical path of the light reflected from said beam splitter;

a first photodetector to receive light emitted from said first light source and reflected from the first medium;

a second photodetector to receive light emitted from said second light source and reflected from the second medium; and a collimating lens arranged between said objective lens and said beam splitter, said collimating lens including a diverging lens with diverging power and a focusing lens with focusing power, wherein said collimating lens satisfies the relationship $-1.5>f/fn$, where f is a total focal length of said collimating lens, and fn is a focal length of the diverging lens.

31. The optical pickup of claim 30, further comprising a wavelength selecting filter between said objective lens and said collimating lens, to control the numerical aperture (NA) of said objective lens.

32. The optical pickup of claim 31, wherein the optical pickup satisfies the relationship $-0.005<1(f1\cdot v1)+1/(f2\cdot v2)+ \ldots +1/(fn\cdot vn)<0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

33. The optical pickup of claim 30, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

34. An optical pickup comprising:

an objective lens selectively arranged opposite first and second media;

a first light source arranged on the optical path of said objective lens, to emit a laser beam toward the first medium;

first, second and third beam splitters arranged on the optical path at predetermined positions from said first light source toward said objective lens;

a second light source arranged on the optical path of the light reflected by the first beam splitter, to emit a laser beam through the first beam splitter toward the second medium;

a first photodetector arranged on the optical path of the light reflected by the third beam splitter, to receive the laser beam emitted from said first light source and reflected from the first medium;

a second photodetector arranged on the optical path of the light reflected by the second beam splitter, to receive the laser beam emitted from said second light source and reflected from the second medium; and a collimating lens arranged between the second and third beam splitters, said collimating lens including a diverging lens with diverging power and a focusing lens with focusing power, wherein said collimating lens satisfies the relationship $-1.5 > f/fn$, where f is a total focal length of said collimating lens, and fn is a focal length of the diverging lens.

35. The optical pickup of claim 34, further comprising a wavelength selecting filter between said objective lens and said collimating lens, to control the numerical aperture (NA) of said objective lens.

36. The optical pickup of claim 35, wherein said first light source emits the laser beam having a wavelength of about 400 nm, and said second light source emits the laser beam having a wavelength of about 650 nm.

37. The optical pickup of claim 36, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

38. The optical pickup of claim 34, wherein said first light source emits the laser beam having a wavelength of about 400 nm, and said second light source emits the laser beam having a wavelength of about 650 nm.

39. The optical pickup of claim 38, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

40. The optical pickup of claim 34, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

41. An optical pickup comprising:

an objective lens selectively arranged opposite first and second media;

a first light source arranged on the optical path of said objective lens, to emit a laser beam toward the first optical disk;

first, second and third beam splitters arranged on the optical path at predetermined positions from said first light source toward said objective lens;

a second light source arranged on the optical path of the light reflected by the first beam splitter, to emit a laser beam through the first beam splitter toward the second medium;

a first photodetector arranged on the optical path of the light reflected by the third beam splitter, to receive the laser beam emitted from said first light source and reflected from the first medium;

a second photodetector arranged on the optical path of the light reflected by the second beam splitter, to receive the laser beam emitted from said second light source and reflected from the second medium; and a collimating lens arranged between said objective lens and the third beam splitter, said collimating lens including a diverging lens with diverging power and a focusing lens with focusing power, wherein said collimating lens satisfies the relationship $-1.5 > f/fn$, where f is a total focal length of said collimating lens, and fn is a focal length of the diverging lens.

42. The optical pickup of claim 41, further comprising a wavelength selecting filter between said objective lens and said collimating lens, to control the numerical aperture (NA) of said objective lens.

43. The optical pickup of claim 42, wherein said first light source emits the laser beam having a wavelength of about 400 nm, and said second light source emits the laser beam having a wavelength of about 650 nm.

44. The optical pickup of claim 43, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

45. The optical pickup of claim 42, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

46. The optical pickup of claim 41, wherein said first light source emits the laser beam having a wavelength of about 400 nm, and said second light source emits the laser beam having a wavelength of about 650 nm.

47. The optical pickup of claim 46, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective tenses, including said objective and collimating lenses, from said light source toward the first or second media, and v1, v2, ..., and vn, are Abbe's numbers of optical materials of the respective lenses.

48. The optical pickup of claim 41, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the first or second media, and v1, v2, ..., and vn, are Abbe's numbers of optical materials of the respective lenses.

49. An optical pickup comprising:

a light source to generate a first light beam with a wavelength within a range of wavelengths under 500 nm for use with recording and/or reproducing with respect to a first medium and a second light beam with a wavelength outside of the range and which is roughly 650 nm for use with recording and/or reproducing with respect to a second medium other than the first medium;

an optical element to focus a generated one of the first and second light beams onto a received one of the first and second media;

a detector to detect the generated light beam reflected from the received one medium; and a collimating lens arranged in an optical path between said light source and said optical element, the collimating lens having a diverging lens with a diverging power sufficient to allow the optical element be capable of:

focusing the first light beam for each of the wavelengths within the range onto the first medium with negligible aberration, and focusing the second light beam with the wavelength of roughly 650 nm onto the second medium with negligible aberration.

50. An optical pickup comprising:

a light source to generate a light beam with a wavelength between roughly 400 nm and 650 nm;

an optical element to focus the light beam onto a medium;

a detector to detect the light beam reflected from the medium; and a collimating lens arranged in an optical path between said light source and said optical element, wherein:

the optical pickup focus the light beam onto the medium with negligible aberration, and said collimating lens comprises a surface with a diverging power, and satisfies the relationship $-1.5 > f/fn$, where f is a total focal length of said collimating lens, and fn is a focal length of the surface with diverging power.

51. The optical pickup of claim 50, further comprising a λ/4 plate disposed in an optical path between said collimating lens and said optical element.

52. The optical pickup of claim 51, further comprising a beam splitter disposed between said collimating lens and said λ/4 plate, wherein said beam splitter transmits the light beam from said collimating lens to said λ/4 plate, and reflects the light beam from the medium to said detector.

53. The optical pickup of claim 50, further comprising a λ/4 plate disposed in an optical path between said collimating lens and said light source.

54. The optical pickup of claim 53, further comprising a beam splitter disposed between said light source and said λ/4 plate, wherein said beam splitter transmits the light beam from said light source to said λ/4 plate, and reflects the light beam from the medium to said detector.

55. The optical pickup of claim 50, wherein said collimating lens further comprises a focusing lens with focusing power disposed between the surface having the diverging power and the medium.

56. The optical pickup of claim 55, wherein the surface having the diverging power comprises a diverging lens.

57. The optical pickup of claim 56, wherein said optical element comprises an objective lens.

58. The optical pickup of claim 57, wherein the optical pickup satisfies the relationship $-0.005 < 1/(f1 \cdot v1) + 1/(f2 \cdot v2) + \ldots + 1/(fn \cdot vn) < 0.0005$, where f1, f2, ..., and fn are focal lengths of respective lenses, including said objective and collimating lenses, from said light source toward the medium, and v1, v2, ..., and vn, are Abbe's numbers of optical materials of the respective lenses.

59. The optical detector of claim 58, wherein said light source and said detector comprise a light emitter/detector device that generates the light beam and detects the light beam.

60. An optical pickup comprising:

light sources to emit respective light beams of different wavelengths, wherein one of the wavelengths is within a range that is less than roughly 500 nm and another one of the wavelengths is more than roughly 500 nm;

an optical element to focus the light beams onto respective media;

detectors to detect respective light beams reflected from the corresponding media; and a collimating lens arranged between said light sources and said optical element, wherein said collimating lens comprises a surface with a diverging power, wherein:

the optical pickup focuses the light beams emitted from the light sources and having passed through the collimating lens onto respective media with negligible aberration, and the diverging power is sufficient to allow the optical pickup to focus the one light beam for each of a plurality of wavelengths within the range below 500 nm onto the respective medium with negligible aberration and also to allow the optical pickup to focus the another light beam having the wavelength above roughly 500 nm onto the respective medium with negligible aberration.

61. An optical pickup comprising:

light sources to emit respective light beams of different wavelengths, wherein one of the wavelengths is less than roughly 500 nm;

an optical element to focus the light beams onto respective media;

detectors to detect respective light beams reflected from the media; and a collimating lens arranged between said light sources and said optical element, wherein said collimating lens comprises a surface with a diverging power, wherein:

the optical pickup focuses light beams onto respective media with negligible aberration, and said collimating lens satisfies the relationship $-1.5 > f/fn$, where f is a total focal length of said collimating lens, and fn is a focal length of the surface with diverging power.

62. The optical pickup of claim 61, wherein said collimating lens further comprises a focusing lens with focusing power disposed between the surface having the diverging power and the media.

63. The optical pickup of claim 62, wherein the surface having the diverging power comprises a diverging lens.

64. The optical pickup of claim 63, wherein said optical element comprises an objective lens.

65. The optical pickup of claim 64, wherein the optical pickup satisfies the relationship $-0.005<1/(f1 \cdot v1)+1/(f2 \cdot v2)+ \ldots +1/(fn \cdot vn)<0.0005$, where f1, f2, . . . , and fn are focal lengths of respective lenses, including said objective and collimating lenses, from said light source toward the medium, and v1, v2, . . . , and vn, are Abbe's numbers of optical materials of the respective lenses.

66. The optical detector of claim 65, wherein at least one of said light sources and one of said detectors comprise a light emitter/detector device that emits and detects a respective light beam.

67. The optical detector of claim 65, further comprising a wavelength selecting filter, wherein said wavelength selecting filter controls the numerical aperture of said objective lens based upon the wavelength of respective light beams.

68. The optical detector of claim 67, further comprising beam splitters disposed between respective light sources and said collimating lens, wherein said beam splitters reflect respective light beams, and transmit other incident light beams.

69. The optical detector of claim 68, wherein at least one of the light beams has a wavelength of about 400 nm, and another of the light beams has a wavelength of about 650 nm.

70. The optical detector of claim 68, where at least one of said beam splitters is disposed between said wavelength selecting filter and said collimating lens and reflects at least one of the light beams from a respective media onto a respective detector.

71. A collimating lens comprising:

a diverging lens with diverging power, wherein the collimating lens satisfies the relationship $-1.5>f/fn$, where f is a total focal length of the collimating lens, and fn is a focal length of said diverging lens.

72. The collimating lens of claim 71, further comprising: a focusing lens with focusing power disposed between a light source and said diverging lens.

73. The collimating lens of claim 71, further comprising: a focusing lens with focusing power, wherein said diverging lens is disposed between a light source and said focusing lens.

74. An optical system comprising:

light sources to emit a light beam having a wavelength within a range under 500 nm and another light beam having a wavelength suitable for recording and/or reproducing data with respect to a digital versatile disc;

an optical element to focus the light beams onto respective media;

detectors to detect a respective light beam reflected from the media; and a collimating lens arranged between said light source and said optical element, wherein said collimating lens comprises a surface with a diverging power, wherein:

the optical system focuses each of the light beams emitted from the light sources and having passed through the collimating lens onto respective media with negligible aberration, and the diverging power is sufficient to allow the optical pickup to focus the one light beam for each of a plurality of wavelengths within the range below 500 nm onto the respective medium with negligible aberration and also to allow the optical pickup to focus the another light beam onto the digital versatile disc with negligible aberration.

75. An optical system comprising:

a light source to emit a light beam of less than roughly 500 nm;

an optical element to focus the light beam onto a respective medium;

a detector to detect the light beam reflected from the medium; and a collimating lens arranged between said light source and said optical element, wherein said collimating lens comprises a surface with a diverging power, wherein:

the optical system focuses the light beam onto the respective medium with negligible aberration, and said collimating lens satisfies the relationship $-1.5>f/fn$, where f is a total focal length of said collimating lens, and fn is a focal length of the surface with diverging power.

76. The optical system of claim 75, wherein said collimating lens further comprises a focusing lens with focusing power disposed between the surface having the diverging power and the media.

77. The optical system of claim 76, wherein the surface having the diverging power comprises a diverging lens.

78. The optical system of claim 77, wherein said optical element comprises an objective lens.

79. The optical system of claim 78, wherein the optical pickup satisfies the relationship $-0.005<1/(f1 \cdot v1)+1/(f2 \cdot v2)+ \ldots +1/(fn \cdot vn)<0.0005$, where f1, f2, . . . , and fn are focal lengths of respective lenses, including said objective and collimating lenses, from said light source toward the medium, and v1, v2, . . . , and vn, are Abbe's numbers of optical materials of the respective lenses.

80. The optical system of claim 79, said light source and said detector comprise a light emitter/detector device that emits and detects the light beam.

81. The optical system of claim 79, further comprising a beam splitter disposed between said light source and said collimating lens, wherein said beam splitter reflects and transmits the light beam.

82. The optical system of claim 81, where said beam splitter reflects the light beam from the respective medium onto said detector.

* * * * *

UNITED STATES PATENT AND TRADEMARK OFFICE
CERTIFICATE OF CORRECTION

PATENT NO. : 7,120,109 B2 Page 1 of 1
APPLICATION NO. : 09/698201
DATED : October 10, 2006
INVENTOR(S) : Tae-kyung Kim et al.

It is certified that error appears in the above-identified patent and that said Letters Patent is hereby corrected as shown below:

Column 13, line 65, change "tens" to -- lens--

Column 19, line 4, change " tenses" to -- lenses --

Signed and Sealed this

Thirteenth Day of February, 2007

JON W. DUDAS
*Director of the United States Patent and Trademark Office*